US010271471B2

United States Patent
Hiddema

(10) Patent No.: US 10,271,471 B2
(45) Date of Patent: Apr. 30, 2019

(54) AGRICULTURAL IMPLEMENT WITH ON-BOARD HYDRAULIC PUMP OR ELECTRICAL GENERATOR

(71) Applicant: AGCO INTERNATIONAL GmbH, Hesston, KS (US)

(72) Inventor: Joris Jan Hiddema, Grubbenvorst (NL)

(73) Assignee: AGCO International GmbH, Neuhausen (CH)

( * ) Notice: Subject to any disclaimer, the term of this patent is extended or adjusted under 35 U.S.C. 154(b) by 31 days.

(21) Appl. No.: 15/276,034

(22) Filed: Sep. 26, 2016

(65) Prior Publication Data

US 2018/0084705 A1   Mar. 29, 2018

(51) Int. Cl.
| | | |
|---|---|---|
| *A01M 7/00* | (2006.01) |
| *B05B 9/00* | (2006.01) |
| *B05B 9/04* | (2006.01) |
| *A01B 59/00* | (2006.01) |
| *A01B 59/042* | (2006.01) |

(52) U.S. Cl.
CPC .......... *A01B 59/002* (2013.01); *A01B 59/042* (2013.01); *A01M 7/0014* (2013.01); *A01M 7/0042* (2013.01); *A01M 7/0082* (2013.01); *B05B 9/007* (2013.01); *B05B 9/0423* (2013.01)

(58) Field of Classification Search
CPC .. A01M 7/0014; A01M 7/005; A01M 7/0042; A01M 7/006; A01M 7/0075; A01M 7/0082; A01M 9/003; A01M 9/0084; A01B 59/00; A01B 59/04; A01B 59/043; A01B 59/06; A01B 59/002; A01B 71/06; A01B 76/00; A01B 63/10; A01B 63/1006; A01B 63/1013; A01B 63/02; A01B 63/118; A01B 63/32; A01B 63/14; A01B 63/24; A01C 23/008; A01C 23/047; A01G 25/09; B05B 7/0093; B05B 13/005; B05B 9/007; B05B 9/0423; F04B 17/05; F04B 23/02–23/028; F04B 53/16; F04B 53/22
USPC ................ 239/77, 159, 168, 172, 175, 670; 74/11–15.88; 180/53.6–53.62; 172/74, 172/75, 35, 272, 810, 812, 776; 111/921, 111/922, 926, 927; 417/231, 233, 271, 417/364
See application file for complete search history.

(56) References Cited

U.S. PATENT DOCUMENTS 3,490,695 A  *  1/1970  Rittenhouse ........ A01M 7/0014
                                                  239/156
3,655,130 A  *  4/1972  Patrick ................ A01M 7/0014
                                                  239/127
(Continued)

OTHER PUBLICATIONS

Mechanical Engineering, "Casting Process—Advantages and Limitations", Nov. 7, 2014, <https://me-mechanicalengineering.com/casting-process-advantages-and-limitations/>.*

(Continued)

*Primary Examiner* — Chee-Chong Lee
*Assistant Examiner* — Cody J Lieuwen

(57) ABSTRACT

An agricultural trailed implement includes a chassis with tongue for hitching to a tractor. A housing is integrated into a loadbearing section of the tongue. A pump or generator is mounted inside the housing and is driven by a PTO shaft connected to an attached tractor. The pump housing may define a sump which provides a fluid reservoir to supply the pump in a hydraulic circuit.

10 Claims, 6 Drawing Sheets

(56) References Cited

U.S. PATENT DOCUMENTS

| | | | | |
|---|---|---|---|---|
| 3,670,963 | A * | 6/1972 | Stroebel | A01M 7/0014 239/168 |
| 5,911,362 | A * | 6/1999 | Wood | A01M 7/0089 239/1 |
| 2002/0069629 | A1 * | 6/2002 | McLeod | A01B 59/042 56/11.9 |
| 2006/0000621 | A1 * | 1/2006 | Ehrhart | A01B 71/06 172/677 |
| 2007/0199293 | A1 * | 8/2007 | Barnett | A01B 59/042 56/11.9 |
| 2012/0085836 | A1 * | 4/2012 | Tiu | A01M 7/0014 239/77 |

OTHER PUBLICATIONS

Peerless Engineering, "Category: Hydraulic Pump", 2014, <http://peerlessengineering.com/blog/category/hydraulic-pump/>.*

* cited by examiner

AGRICULTURAL IMPLEMENT WITH ON-BOARD HYDRAULIC PUMP OR ELECTRICAL GENERATOR

CROSS-REFERENCE TO RELATED APPLICATIONS

Not Applicable.

BACKGROUND OF THE INVENTION

Field of the Invention

The invention relates to agricultural machinery and particularly to implements or working tools that are attachable to, and towed by, agricultural tractors. The invention particularly relates to wheeled or trailed implements that are attachable to a hitch or drawbar of a tractor.

Description of Related Art

For many decades farmers have worked the land with agricultural implements or working tools that are attached to the hitch of a tractor and moved across fields. Many such implements are known to carry out the various agricultural tasks involved with growing crops. Some implements can be considered passive and are simply dragged across a field, carrying out their action simply by means of contact with the ground or deriving mechanical power through wheels and a ground-drive mechanism. A harrow is one example of such a 'passive' tool.

Other implements can be considered 'active' and these are powered or driven by an auxiliary power source, commonly located on an attached tractor but sometimes located on the implement. In the majority of applications, the power is supplied in the form of mechanical torque via a power take-off (PTO) shaft attached to the PTO stub of an attached tractor. However, it is also known to drive hydraulic or electrical motors located on the implement by pressurized fluid or electrical power sourced from the tractor. Examples of such active implements include balers, sprayers and planters.

The use of hydraulic motors on implements is becoming increasingly common to drive various working components and systems. It is known to provide PTO-driven hydraulic pumps on the implement to avoid the need for hydraulic couplings to the tractor.

BRIEF SUMMARY OF THE INVENTION

In accordance with a first aspect of the invention there is provided an agricultural implement having a wheeled chassis with a tongue for attachment to a tractor hitch, a pump housing integrated into a loadbearing section of the tongue, and, a hydraulic pump mounted inside the pump housing and arranged so as to be connectable to a power take-off of an attached tractor.

In accordance with a second aspect of the invention there is provided an agricultural trailed crop sprayer having a frame carried by a pair of ground-engaging wheels, a multi-section tongue secured to the frame and configured for attachment to a tractor drawbar, a hydraulic system comprising a pump and a motor in hydraulic communication, and a pump housing integrated into a loadbearing section of the tongue wherein the pump is mounted inside the pump housing.

In accordance with a third aspect of the invention there is provided an agricultural trailed implement comprising a drawbar for attachment to a tractor, and a hydraulic pump or electrical generator housed inside the drawbar.

BRIEF DESCRIPTION OF THE DRAWINGS

The advantages of the invention will be apparent from reading the following description of specific embodiments of the invention with reference to the appended drawings in which.

DETAILED DESCRIPTION OF THE INVENTION

Figure 1:
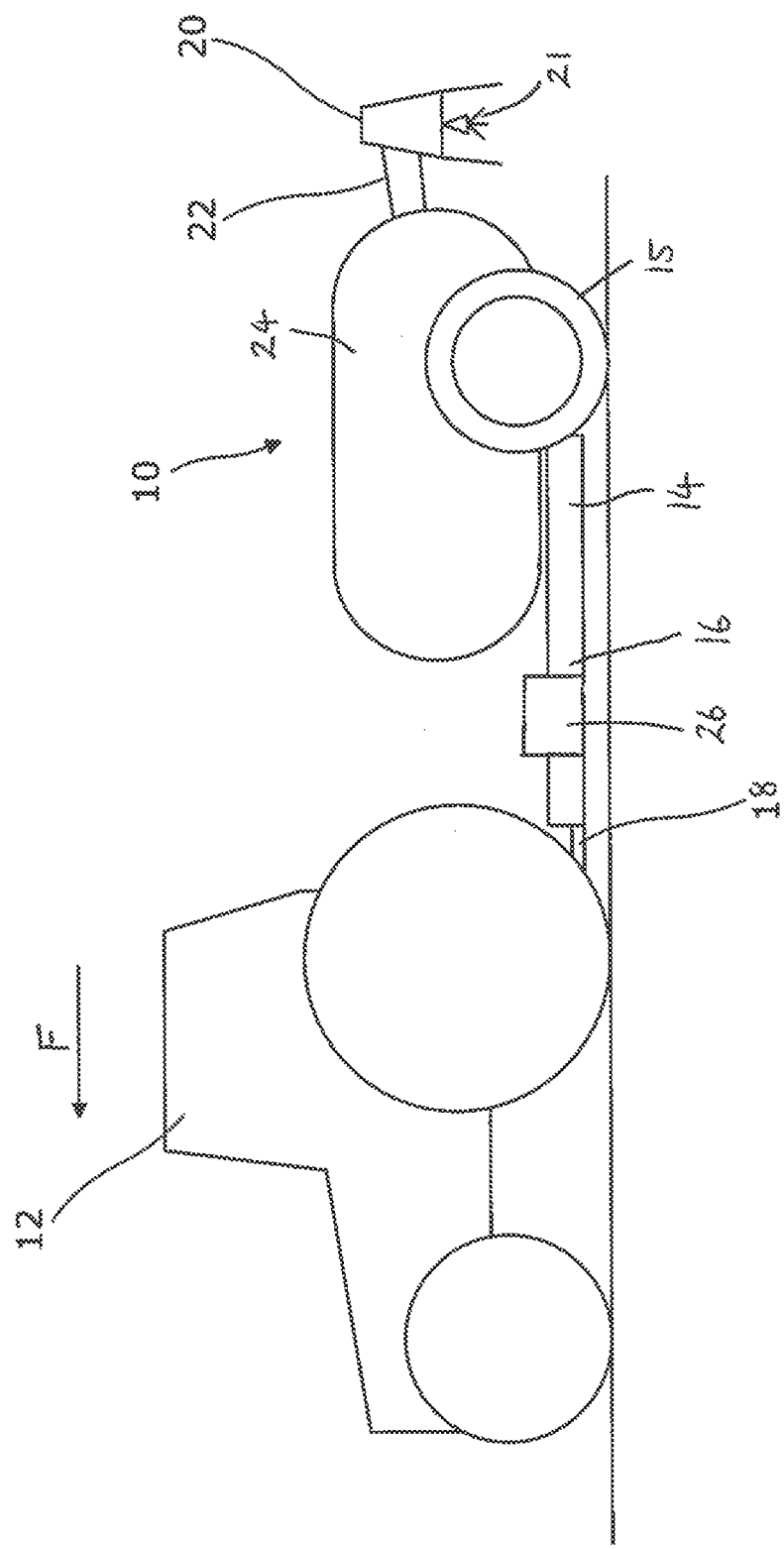
FIG. 1 is a highly schematic side view of an agricultural tractor and a trailed crop sprayer suitable for embodying aspects of the invention.
Figure 2:
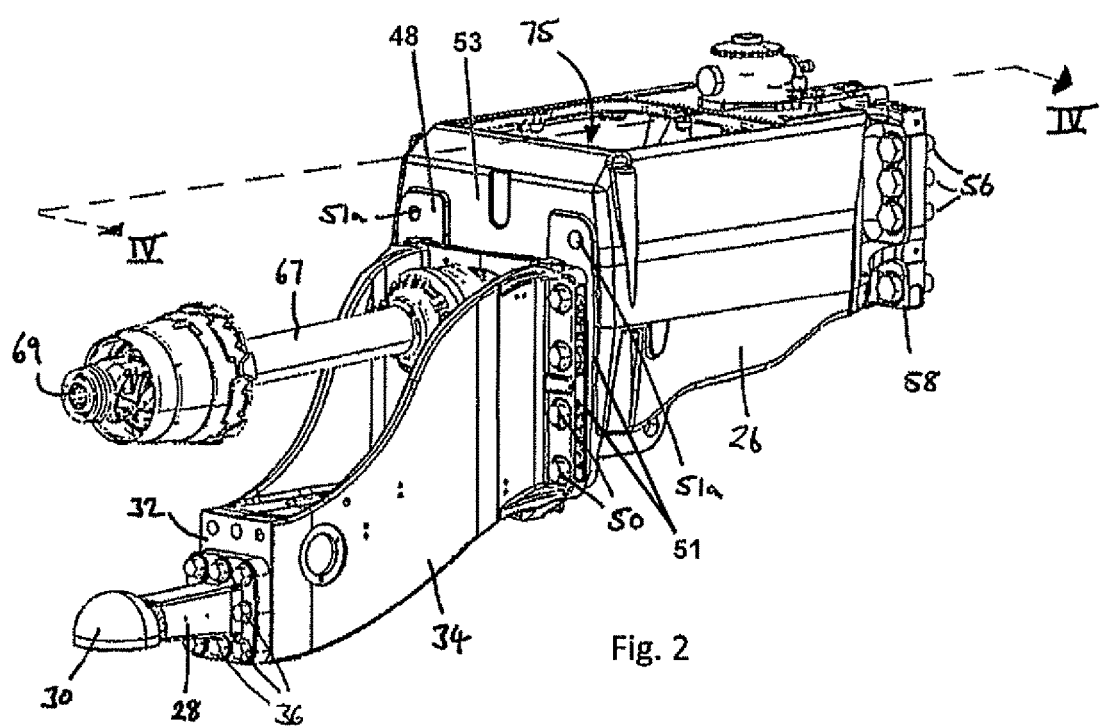
FIG. 2 is an isometric front view of a multi-section chassis tongue of an implement in accordance with an embodiment of the invention.
Figure 3:
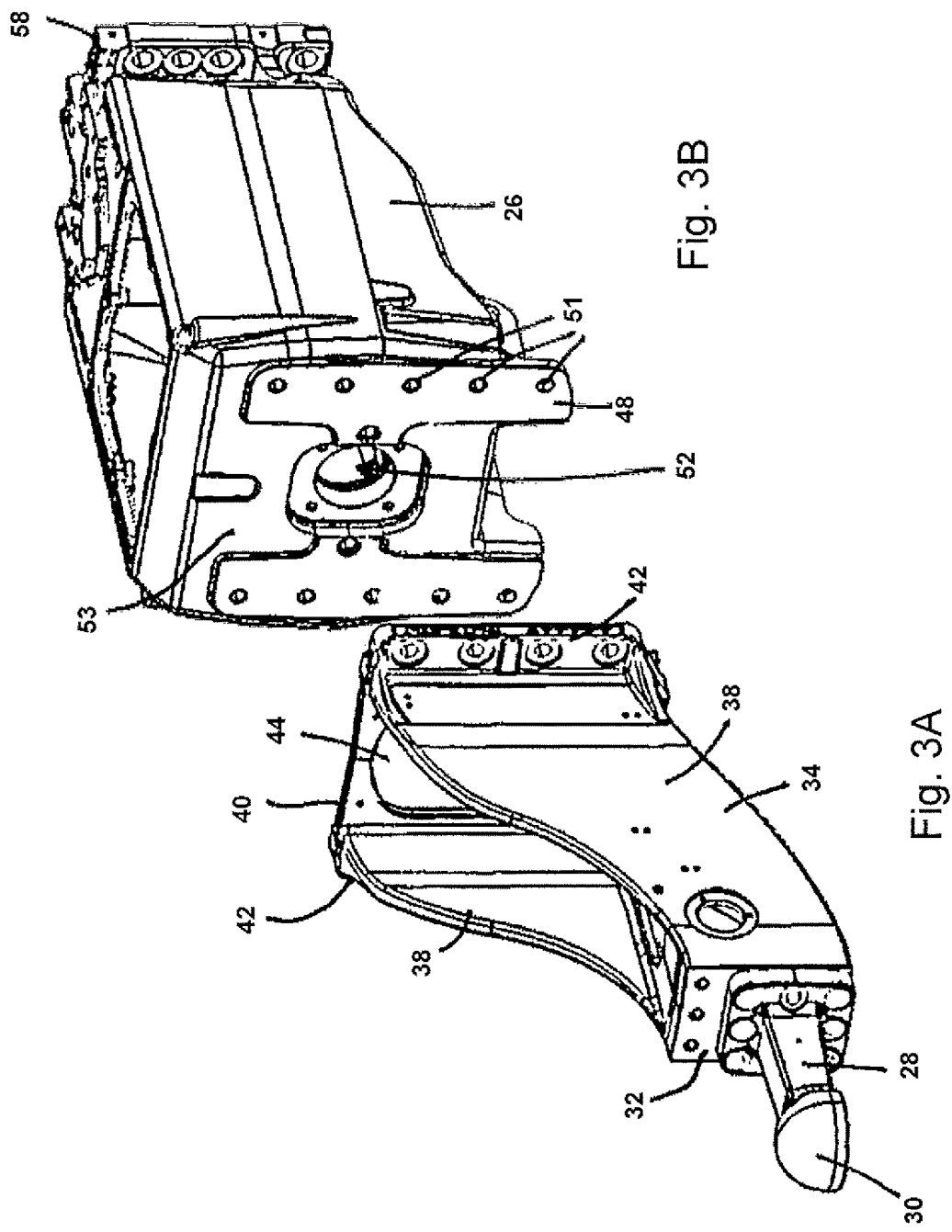
FIGS. 3A and 3B are isometric views of the tongue of FIG. 2 showing the two sections in exploded form to reveal apertures for the PTO driveline.
Figure 4:
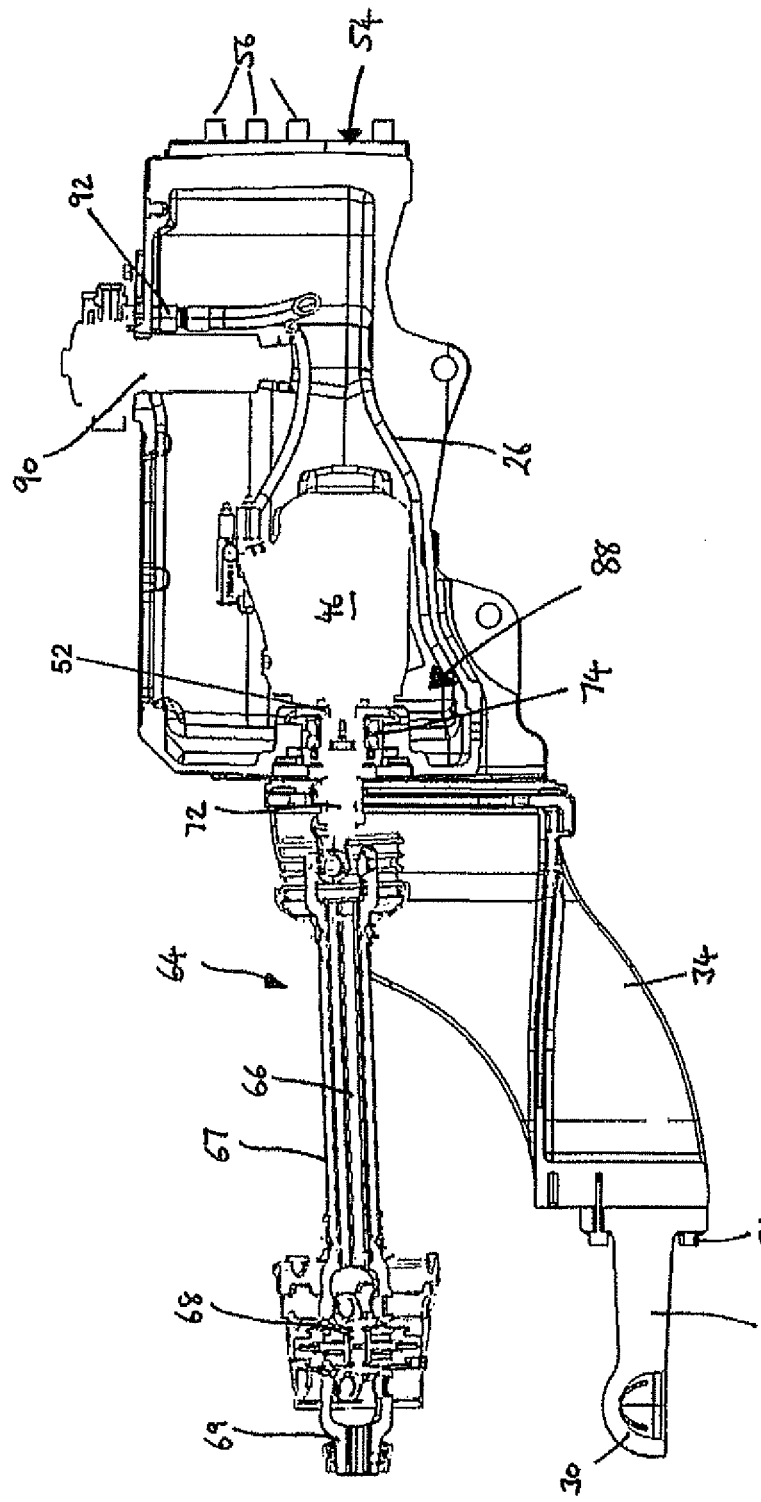
FIG. 4 is a section view of the tongue of FIG. 2 taken along cut line IV-IV.
Figure 5:
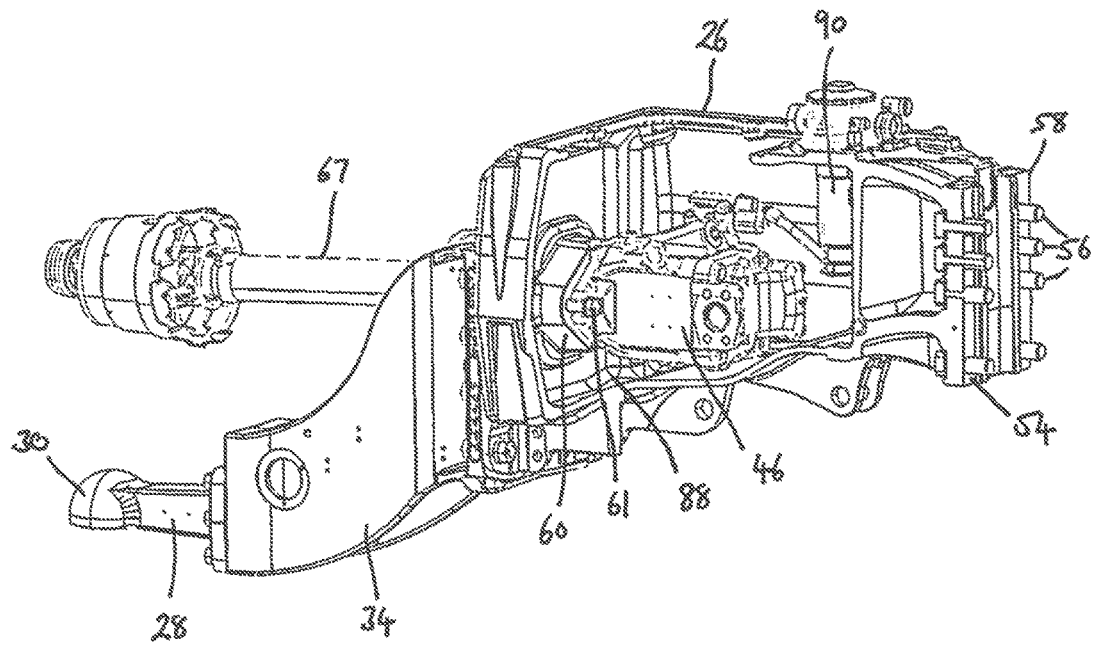
FIG. 5 is an isometric rear view of the tongue of FIG. 2 shown with part of the pump housing cut away to reveal the hydraulic pump.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Use of directional terms such as "front", "rear", "longitudinal" and "transverse" in the following description of specific embodiments are made in relation to the normal forward direction of travel of an agricultural tractor and implement combination having a longitudinal axis parallel to the direction of travel.

FIG. 1 illustrates an agricultural trailed crop sprayer 10 attached to a wheeled agricultural tractor 12 for movement in a normal forward direction indicated by arrow 'F'. The sprayer 10 comprises a chassis or frame 14 which supports a pair of ground-engaging wheels 15. It should be appreciated that the sprayer may comprise more than one pair of wheels without deviating from the scope of the invention.

The chassis 14 includes a tongue 16 extending forwardly from a main portion 17 for attachment to a drawbar or hitch 18 of the tractor 12. The chassis 14 also carries a transversely-extending spray boom 20 which carries a plurality of dispensing devices in the form of nozzles 21, the boom 20 being suspended from the frame by a lift-arm arrangement 22 as is known in the art. A storage tank 24 for the holding of pesticide solution and the like is also carried by the frame 14.

It should be understood that the invention is also applicable to other agricultural implements and working tools beyond sprayers. By way of example only, other agricultural implements include balers, planters, fertilizer spreaders, mowers, powered tillage tools, and hay tools.

The tongue 16 bears a portion of the weight of the sprayer 10. A draft (towing) force exerted by the tractor 12 is transmitted to the frame 14 via the hitch 18 and tongue 16. In accordance with aspects of the invention a pump housing 26 is integrated into a loadbearing section of the tongue 16, the details of which shall become clear from the following description.

FIGS. 2 to 5 illustrate various views of a tongue 26 constructed in accordance with a specific embodiment of at least one aspect of the invention. The illustrated tongue comprises three sections bolted together in a series-arrangement so that a draft force can be transmitted through the combination.

A first section 28 comprises a female ball hitch portion 30 for attachment to a male ball hitch (not shown) disposed on the tractor 12. It should be understood that the illustrated ball hitch represents merely one example of a suitable mechanism to hitch the sprayer 10 to the tractor 12 and many other alternatives will be apparent to one skilled in the art. By way of example, the ball hitch could be replaced with a drawbar-receiving jaw arrangement, securable by a pin.

The first section 28 is secured to a front face 32 of a second section 34 by bolts 36. The second tongue section 34 is swan-necked in shape when viewed from the side (best seen in FIG. 4) raising the height and ground clearance of the tongue 16 from front to rear. Two side plates 38 having the swan-necked profile extend from the front face 32 to a rear plate 40 which defines a pair of side flanges 42 extending outside of the side plates 38 and comprises a central aperture (or opening) 44 cut between the side plates 38.

The third section of tongue 16 is formed from the pump housing 26 which is a cast, box-like, structure configured to house a pump 46. The second tongue section 34 is secured to a forward-facing machined surface 48 of pump housing 26 by bolts 50 which are received in threaded bores 51 provided in the machined surface 48.

More threaded bores 51 than number of holes on the side flanges 42 may be provided to allow the second section 34 to be mounted in more than one alternative position. This allows the height of the hitch 30 to be adjusted relative to the chassis 12 to cater for different tractor hitch heights. The "spare" threaded bores 51a can be seen in FIG. 2.

A second aperture 52 is provided in the front wall 53 of pump housing 26 through which the driveline passes, as is described below.

A rear face 54 of pump housing 26 is secured to a primary frame member (not shown) of the chassis 14 by bolts 56 which pass through holes provided in a pair of side flanges 58 cast into the structure of pump housing 26. Together, the first section 28, second section 34 and pump housing 26 provide a rigid, multi-section, tongue 16 which couples the sprayer 10 to the tractor 12 and transmits a draft force accordingly.

The hydraulic pump 46 is mounted inside the pump housing 26 and arranged so as to be connectable to a PTO of the tractor 12. Best seen in FIG. 5, an internal annular boss 60 is cast into the front wall 53 of pump housing 26, in a generally central location, the aperture 52 defined thereby aligning with that of the driveline to be described below. The pump 46 is secured to the front wall of pump housing 26 by bolts 61 that are received by holes formed in the boss 60.

The pump 46 is preferably a variable displacement axial piston pump. However, it is envisaged that other types of hydraulic pump, including fixed displacement pumps, may be used instead.

The pump 46 derives power from a PTO of an attached tractor 12. As such, the sprayer 10 comprises a driveline 64 upstream of the pump 46 that includes a quick-couple PTO shaft 66 of a known construction, the shaft being protected by a guard 67. At a front end the PTO shaft 66 includes a first universal joint 68 and a first splined female portion 69 to releasably latch onto a corresponding splined PTO stub provided at the rear of the attached tractor 12. At the opposite, rear, end, the PTO shaft 66 includes a second universal joint 70 and a second splined female portion 71 to releasably latch onto a corresponding splined stub 72 which is in driving connection with the driveshaft of pump 46. A bearing 74 supports the splined stub 72 in position relative to the housing 26, the bearing 74 facilitating rotational motion of the stub 72 and being secured to the front wall of housing 26.

The driveline 64 connects the tractor PTO stub to the pump 46 and passes through the first aperture 44 provided in the second tongue section 34, and through the second aperture 52 provided in the front wall 53 of pump housing 26.

The pump 46 is operable to work at a range of input drive speeds. However, the tractor PTO typically operates at around 540 r.p.m. The output flow of pump 46 is variable by means of adjusting at least one of the PTO speed or the angle of the pump swashplate.

The pump housing preferably comprises a access hatch 75 in the top surface to allow access to service the pump 46.

The sprayer 10 comprises an on-board hydraulic system 80 that is fluidly isolated from the attached tractor 12. In other words, no fluid is conveyed between the tractor 12 and the sprayer 10 during operation, thus avoiding the need for fluid line couplings between the tractor 12 and sprayer 10. Instead, the hydraulic system 80 comprises a closed hydraulic circuit to be described in more detail below and with reference to FIG. 6.

Figure 6:
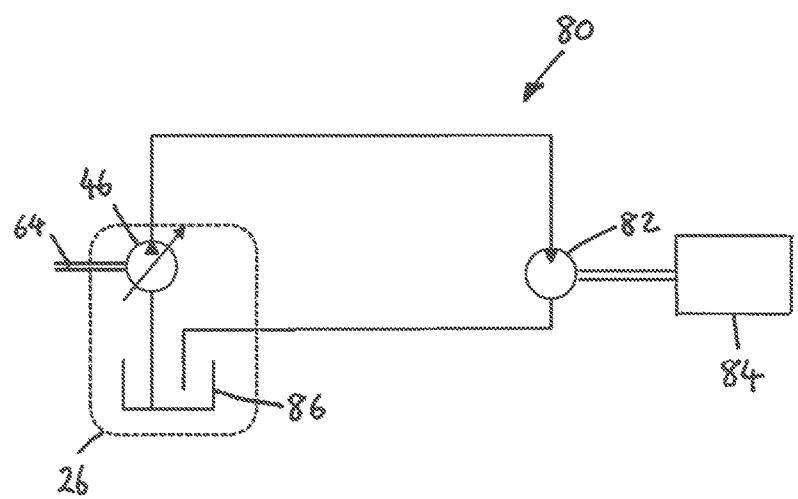
FIG. 6 is a simplified schematic diagram of a hydraulic circuit in accordance with an embodiment of the invention; and, FIG. 7 is a simplified schematic diagram of an electrical circuit in accordance with another embodiment of the invention.

The hydraulic system 80 is represented in highly schematic form in FIG. 6 and includes pump 46 shown as being driven by driveline 64 and housed inside pump housing 26. The sprayer 10 may comprise one or more hydraulic consumers such as hydraulic motors, represented at 82. A hydraulic motor 82 may, for example, drive a fluid delivery system 84 which conveys fluid (e.g. pesticide) from the tank 24 to the nozzles 21 during operation.

Pump 46 is in hydraulic communication with motor 82 in the hydraulic circuit shown. It should be appreciated that, although shown as being directly connected, the pump 46 may be connected to the motor 82 via one or more hydraulic valves and the like.

The system 80 further comprises a fluid reservoir 86 which, in accordance with an aspect of the invention, comprises a sump 88 provided in the base of pump housing 26. The sump 88 is defined by the cast internal profile of the pump housing 26 and serves to retain a reservoir of hydraulic fluid to supply the pump 46. In one example, the sump 88 is filled with approximately 60 liters of oil.

The pump 46 itself may, in one embodiment, be immersed in the oil contain by the sump 88. However, it should be understood that the fluid reservoir 86 may alternatively be provided separate from the pump housing 26.

The housing 26 may also house a filter 90 which is connected to the pump 46 in the circuit.

The hydraulic connections to the pump 46 may comprise unions 92 that are secured in threaded bores machined into the pump housing 26, thereby facilitating the conveyance of pressurized fluid from inside the housing 26 to outside, and vice versa.

Although described in relation to a trailed crop sprayer 10, it is emphasized that the described aspects of the invention are also applicable to agricultural implements, especially, but not exclusively, those that are operable to dispense a crop input such as seed, pesticide or fertilizer onto a crop field. For example, seeders, planters, fertilizer spreaders and sprayers typically include a storage tank or hopper for holding crop inputs, a plurality of dispensing devices operable to apply the crop inputs to the crop field, and a input delivery system operable to convey the crop inputs from the tank or hopper to the dispensing devices. The input delivery system may be driven by a hydraulic motor which is in hydraulic communication with the pump in a similar manner to that described above.

Although the above-described embodiments involve a hydraulic pump housed within a pump housing, it is envisaged that aspects of the invention can apply to an arrangement with an electrical generator housed inside a housing that is integrated into a loadbearing section of the hitch tongue. In such a setup, the generator can form part of an on-board electrical system that includes electrical consumers powered by the generator, wherein the electrical system may be electrically isolated from the attached tractor.

Figure 7:
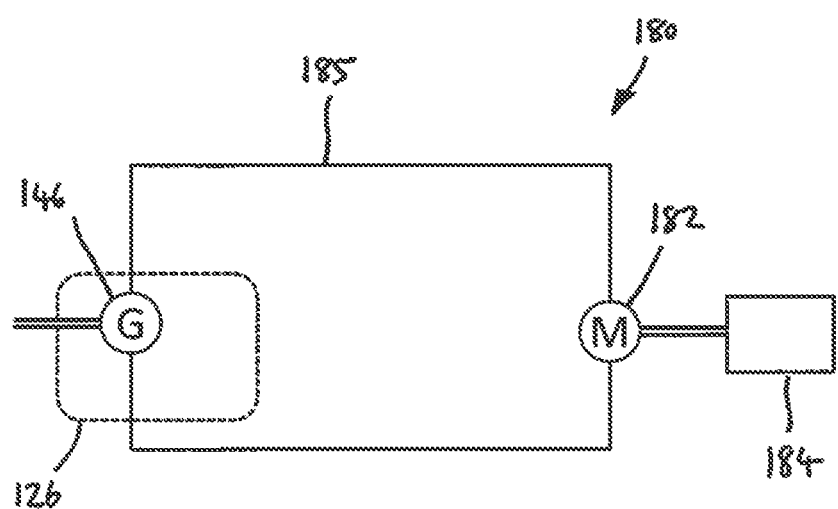

An example of such an electrical system 180 is represented in highly schematic form in FIG. 7 and includes a generator 146 shown as being driven by driveline 64 and housed inside a generator housing 126. An implement embodying the electrical system 180 may comprise one or more electrical consumer such as electrical motors, represented at 182. The electrical motor may, for example, drive a load such as a fluid delivery system 184.

Generator 146 connected with motor 182 in the electrical circuit 185 shown.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. An agricultural implement comprising:
   a wheeled chassis with a tongue for attachment to a tractor hitch, wherein the tongue comprises:
   a pump housing forming a loadbearing section of the tongue and having a front face and a rear face, wherein the rear face is secured to the wheeled chassis;
   a front portion comprising a drawbar for attaching to the tractor hitch, wherein the front portion is fastened to the front face of the pump housing;
   wherein the pump housing and the front portion are arranged in a series arrangement so as to transmit a draft force from the tractor hitch to the wheeled chassis; and
   a hydraulic pump mounted and enclosed inside the pump housing and arranged so as to be connectable to a power take-off of an attached tractor.

2. The agricultural implement according to claim 1, further comprising a hydraulic circuit which includes the pump and a fluid reservoir, wherein the fluid reservoir comprises an oil sump provided by the pump housing.

3. The agricultural implement according to claim 2, wherein the hydraulic circuit is fluidly isolated from an attached tractor.

4. The agricultural implement according to claim 1, wherein the pump housing is cast.

5. The agricultural implement according to claim 1, wherein the front portion has a ground clearance that increases from the drawbar to the pump housing.

6. The agricultural implement according to claim 1, wherein the front portion defines a first aperture which is aligned with a second aperture provided in the front face of the pump housing.

7. The agricultural implement according to claim 6, further comprising a driveline connected to the pump, wherein the driveline passes through the first and second apertures.

8. The agricultural implement according to claim 1, wherein the pump is a variable displacement axial piston pump.

9. The agricultural implement according to claim 1 and configured to apply crop inputs to a crop field, the implement further comprising a storage tank or hopper for holding crop inputs, a plurality of dispensing devices operable to apply the crop inputs to the crop field, and an input delivery system operable to convey the crop inputs from the tank or hopper to the dispensing devices, wherein the input delivery system is driven by a hydraulic motor which is in hydraulic communication with the pump.

10. An agricultural crop sprayer according to claim 1.

* * * * *